United States Patent
Kim et al.

(10) Patent No.: US 7,640,368 B2
(45) Date of Patent: Dec. 29, 2009

(54) AUTOMATIC DRIVER INSTALLATION METHOD AND SYSTEM

(75) Inventors: Jeong-sang Kim, Suwon-si (KR); In-sung Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 11/010,380

(22) Filed: Dec. 14, 2004

(65) Prior Publication Data

US 2005/0132090 A1 Jun. 16, 2005

(30) Foreign Application Priority Data

Dec. 15, 2003 (KR) .................... 10-2003-0091333

(51) Int. Cl.
*G06F 3/00* (2006.01)
(52) U.S. Cl. .......................................... 710/8; 719/327
(58) Field of Classification Search ................ 710/8
See application file for complete search history.

(56) References Cited

U.S. PATENT DOCUMENTS

| | | | | |
|---|---|---|---|---|
| 5,655,148 | A | * | 8/1997 | Richman et al. ............... 710/8 |
| 5,802,365 | A | * | 9/1998 | Kathail et al. ................ 719/321 |
| 5,819,015 | A | | 10/1998 | Martin et al. ................ 395/114 |
| 6,513,159 | B1 | * | 1/2003 | Dodson ........................ 717/178 |
| 6,615,297 | B1 | * | 9/2003 | Beard et al. .................... 710/62 |
| 6,813,670 | B1 | * | 11/2004 | Yao et al. ..................... 710/302 |
| 7,283,263 | B2 | * | 10/2007 | Sugiura et al. .............. 358/1.15 |
| 2002/0083227 | A1 | * | 6/2002 | Machida ....................... 710/8 |
| 2003/0023770 | A1 | * | 1/2003 | Barmettler et al. ........... 709/327 |

FOREIGN PATENT DOCUMENTS

| | | |
|---|---|---|
| JP | H05-169736 | 7/1993 |
| JP | H06-297782 | 10/1994 |
| JP | 2001-034444 | 2/2001 |
| KR | 2001-0027256 | 4/2001 |
| KR | 2001-0049221 | 6/2001 |
| KR | 2003-0058410 | 7/2003 |

\* cited by examiner

*Primary Examiner*—Henry W. H. Tsai
*Assistant Examiner*—Juanito C Borromeo
(74) *Attorney, Agent, or Firm*—Roylance, Abrams, Berdo and Goodman, LLP

(57) ABSTRACT

A method and system for automatically installing drivers in a host device for driving an apparatus that is connected to the host device and having at least one emulation. The method includes the steps of executing a driver installation module included in the host device, the driver installation module requesting the apparatus to transmit model information of the apparatus and emulation information indicating which emulations are included with the apparatus, and receiving the emulation information and the model information from the apparatus. The driver installation module then automatically selecting and installing drivers based on the received emulation information and the received model information.

10 Claims, 5 Drawing Sheets

AUTOMATIC DRIVER INSTALLATION METHOD AND SYSTEM

CROSS-REFERENCE TO RELATED APPLICATIONS

This application claims the benefit under 35 U.S.C. §119(a) of Korean Patent Application No. 2003-91333, filed in the Korean Intellectual Property Office on Dec. 15, 2003, the entire contents of which are incorporated herein by reference.

BACKGROUND OF THE INVENTION

1. Field of the Invention

The present invention relates to an automatic driver installation method and system. More particularly, the present invention relates to an automatic driver installation method and system for automatically installing drivers by receiving emulation information and model information from a printer or a multi-functional device, and by providing a unified driver installation module including all drivers corresponding to emulations included in the printer or the multi-functional device.

2. Description of the Related Art

Various kinds of printers or multi-functional devices (MFDs) have been developed. An MFD is a device that includes functions of a printer, copier, and scanner in a single device. A driver for driving an MFD should be installed in a host device connected to such an MFD in order to perform a printing or scanning process using the MFD. For example, U.S. Pat. No. 5,819,015 entitled "Method And Apparatus For Providing Remote Printer Resource Management" issued to Martin et al. discloses a system having a host device and a printer in which the printer has a bi-directional data communications capability.

An MFD includes at least one emulation in order to print or scan data received from a host device connected thereto. There are various kinds of emulations which can be included. According to a model of an MFD, emulations included in the MFD are configured as a combination of various emulations. To drive an emulation that supports any model of the MFD, a driver corresponding to the emulation is required to be installed in the host device. Such a driver is included in a driver installation module.

FIG. 1 is a block diagram of a conventional installation module corresponding to a number of models. Referring to FIG. 1, a first installation module 20, a second installation module 22, and a third installation module 24 are provided in order to drive a first model 10, a second model 12, and a third model 14, respectively. That is, if the emulations 11 which are supported by the first model 10 are printer control language (PCL) and Postscript (PS), drivers 21 included in the first installation module 20 include a PCL driver and a PS driver. Also, if emulations 13 which are supported by the second model 12 are PCL and TWAIN, drivers 23 included in the second installation module 22 include a PCL driver and a TWAIN driver. For reference, TWAIN is an application program interface (API) standard of a scanner. Further, if emulations 15 which are supported by the third model 14 are PCL, Samsung printer language (SPL), and TWAIN, drivers 25 included in the third installation module 24 include a PCL driver, an SPL driver, and a TWAIN driver. That is, drivers corresponding to the emulations supported by each model are included in each driver installation module.

As described above, an installation module corresponding to a model is made by determining the types of drivers included in the installation module based on the emulations supported by each model. That is, a developer is required to make an installation module corresponding to each model. Therefore, significant time and cost are needed to make a driver installation module for each model.

For example, when a user executes an installation module to install a plurality of drivers, the user is required to manually select drivers that the user wants to install. Therefore, the user may encounter a great degree of difficulty in installing drivers.

Accordingly, a need exists for a system and method to quickly and easily determine what emulations are included in an apparatus and thereafter, quickly and easily select corresponding drivers for each.

SUMMARY OF THE INVENTION

To resolve the above and other problems, the present invention provides an automatic driver installation method of automatically installing drivers by receiving emulation information and model information from a printer or a multi-functional device (MFD) and thereafter, providing a unified driver installation module including all drivers corresponding to emulations included in the printer or the MFD.

Embodiments of the present invention also provide an automatic driver installation system for automatically installing drivers by receiving emulation information and model information from a printer or an MFD and thereafter, providing a unified driver installation module including all drivers corresponding to emulations included in the printer or the MFD.

According to an aspect of the present invention, a method is provided of automatically installing drivers in a host device for driving an apparatus that is connected to the host device and having at least one emulation. The method includes the steps of first executing a driver installation module included in the host device, wherein the driver installation module requests the apparatus to transmit model information of the apparatus and emulation information indicating which emulations are included with the apparatus. The driver installation module then receives the emulation information and the model information from the apparatus, and the driver installation module automatically installs the host device drivers based on the received emulation information and the received model information.

According to another aspect of the present invention, a system is provided comprising an apparatus having at least one emulation, and a host device connected to the apparatus, the system being configured for automatically installing drivers in the host device for driving the apparatus. The system includes means for executing a driver installation module included in the host device, means included in the driver installation module for requesting the apparatus to transmit both model information of the apparatus and emulation information indicating which emulations are included with the apparatus, means included in the driver installation module for receiving the emulation information and the model information from the apparatus, and means included in the driver installation module for automatically installing drivers based on the received emulation information and the received model information.

BRIEF DESCRIPTION OF THE DRAWINGS

The above and other features and advantages of the present invention will become more apparent by describing in detail exemplary embodiments thereof with reference to the attached drawings in which.

Throughout the drawings, like reference numerals will be understood to refer to like parts, components and structures.

DETAILED DESCRIPTION OF THE EXEMPLARY EMBODIMENTS

Hereinafter, exemplary embodiments of the present invention will be described in detail with reference to the attached drawings. A detailed description of the prior art and members of the present invention that are considered as obscuring the essential point of the present invention will be omitted. Terms used hereinafter are used considering the functions in the present invention and may be changed according to a user's or operator's intention or usual practice. Accordingly, the terms will be defined based on the entire content of the description of the present invention.

Figure 1:
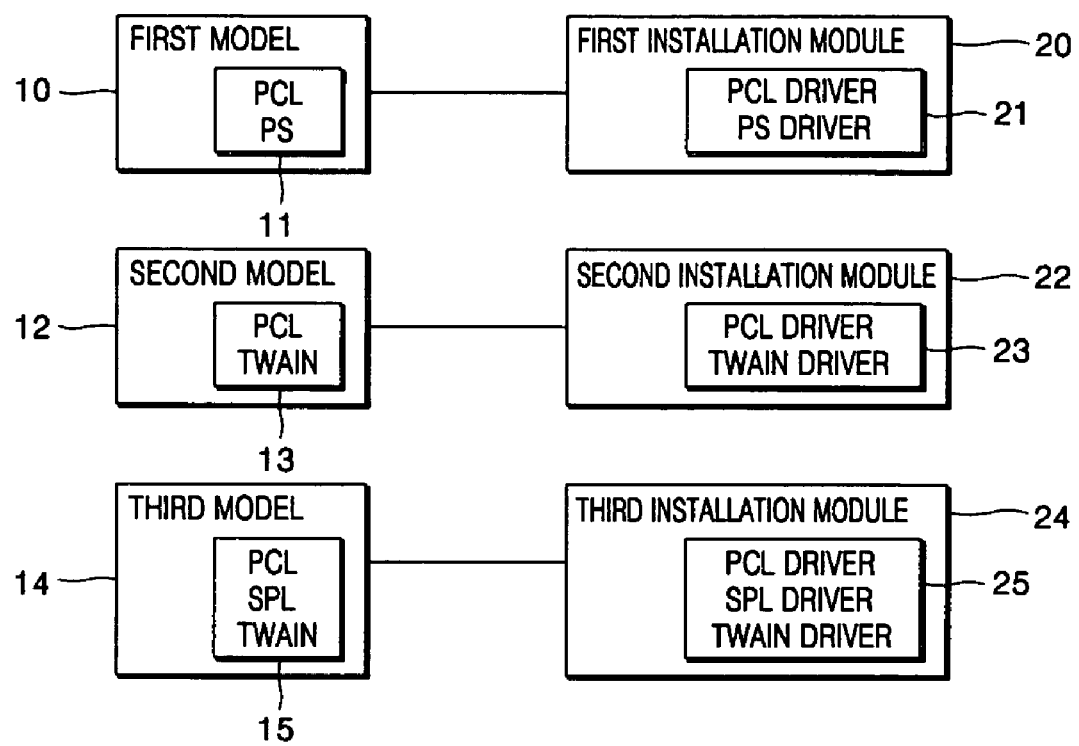
FIG. 1 is a block diagram of conventional installation modules corresponding to a number of models.
Figure 2:
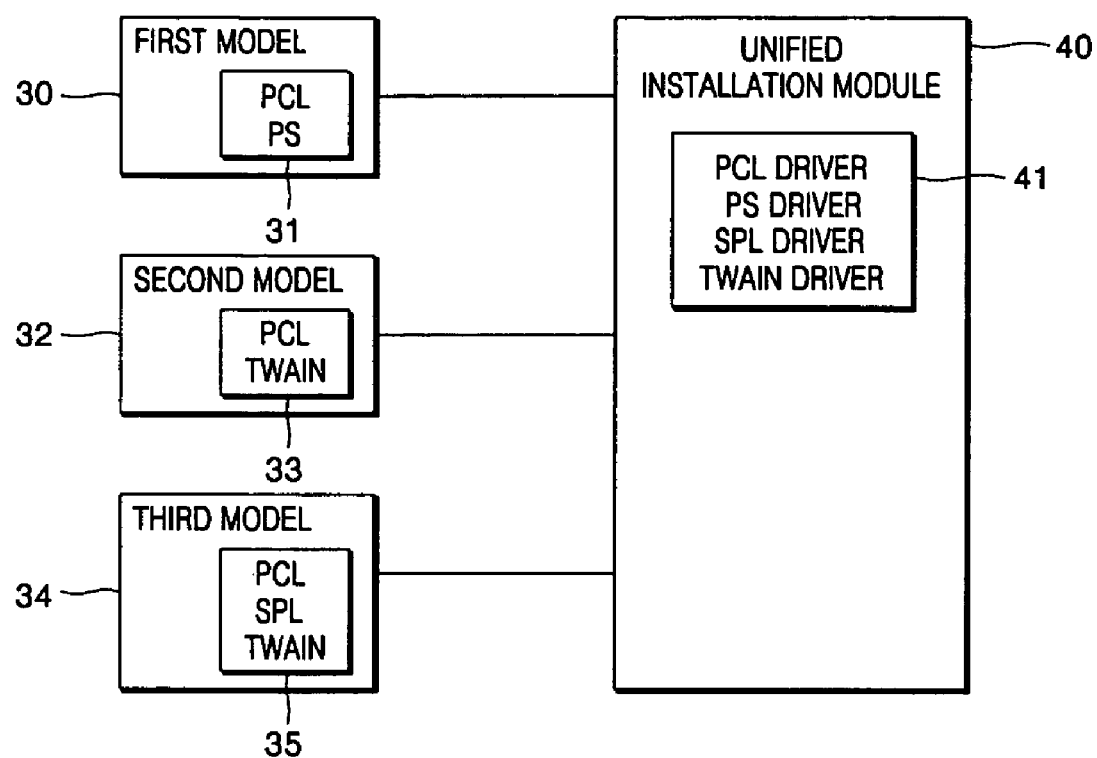
FIG. 2 is a block diagram of a unified installation module according to an embodiment of the present invention.

FIG. 2 is a block diagram of a unified installation module according to an embodiment of the present invention. Referring to FIG. 2, a unified installation module 40 is provided in order to drive a first model 30, a second model 32, and a third model 34. As shown, emulations 31 which are supported by the first model 30 are printer control language (PCL) and Postscript (PS), emulations 33 which are supported by the second model 32 are PCL and TWAIN, and emulations 35 which are supported by the third model 34 are PCL, Samsung printer language (SPL), and TWAIN. For reference, TWAIN is an application program interface (API) standard of a scanner.

In order to install drivers corresponding to each model 30, 32 and 34 in a host device, a unified installation module 40 is provided in the host device. Drivers 41 included in the unified installation module 40 include a PCL driver, a PS driver, an SPL driver, and a TWAIN driver. It is noted that the above models, emulations and drivers are presented as one example, and any number or configuration of models and emulations can be provided, and any number of drivers can be included in the unified installation module. Preferably, the unified installation module includes all drivers that can be provided by manufacturers of printers or multi-functional devices (MFDs), corresponding to all emulations supported by the printers or the MFDs. Therefore, drivers corresponding to emulations supported by each model, can be selected and installed in the host device by using the unified installation module 40.

Figure 3:
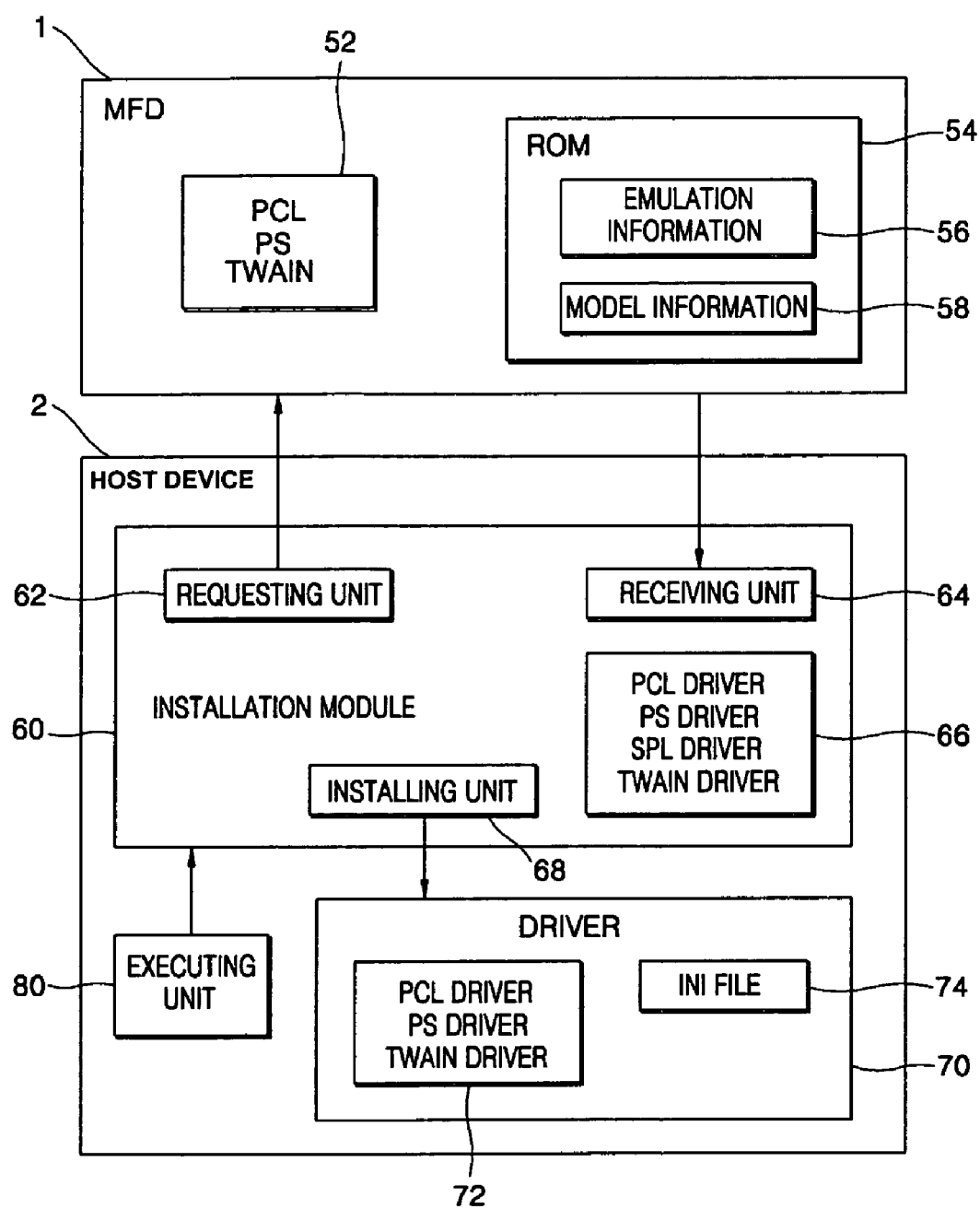
FIG. 3 is a block diagram of an automatic driver installation system according to an embodiment of the present invention.

FIG. 3 is a block diagram of an automatic driver installation system according to an embodiment of the present invention. Referring to FIG. 3, a system including an apparatus 1 having at least one emulation, and further including a host device 2 connected to the apparatus 1, are each shown. For example, the apparatus may be an MFD 1.

Emulation examples 52 included in the MFD 1 are PCL, PS, and TWAIN. The MFD 1 also includes a read only memory (ROM) 54. The ROM 54 stores model information 58 of the MFD 1, and emulation information 56 indicating which emulations are included with the MFD 1.

The host device 2 includes a driver installation module 60, drivers 70, and an executing unit 80. The executing unit 80 executes the driver installation module 60 according to the instructions of a user.

The driver installation module 60 may include all drivers 66 corresponding to all emulations 52 included or which could be included in the MFD 1. For example, the driver installation module 60 includes a PCL driver, a PS driver, an SPL driver, and a TWAIN driver. In addition, the driver installation module 60 can include drivers that can be provided by the manufacturer of the MFD. Additionally, a warning message can be output when the driver installation module 60 does not include drivers corresponding to emulations included in the MFD 1. Here, the warning message or a notification message, can be displayed on a monitor (not shown) of the host device 2, or can be printed by using the MFD 1.

The installation module 60 further includes a requesting unit 62, a receiving unit 64, and an installing unit 68. The requesting unit 62 requests the MFD 1 to transmit the emulation information 56 and the model information 58. The receiving unit 64 receives the emulation information 56 and the model information 58 from the MFD 1. The installing unit 68 then automatically selects and installs drivers 70 based on the received emulation information 56 and model information 58.

The installing unit 68 automatically selects drivers corresponding to respective emulations from among drivers 66 included in the installation module 60 based on the received emulation information. Referring to FIG. 3, since emulation examples 52 included in the MFD 1 are PCL, PS, and TWAIN, the installing unit 68 automatically configures drivers 70 by selecting a PCL driver, a PS driver, and a TWAIN driver from among drivers 66 included in the installation module 60. A user is then requested to confirm whether the user wishes to install the automatically configured driver or not. Also, the installing unit 68 further configures an initialization (INI) file 74 which is a file defining the model based on the received model information 58.

Figure 4:
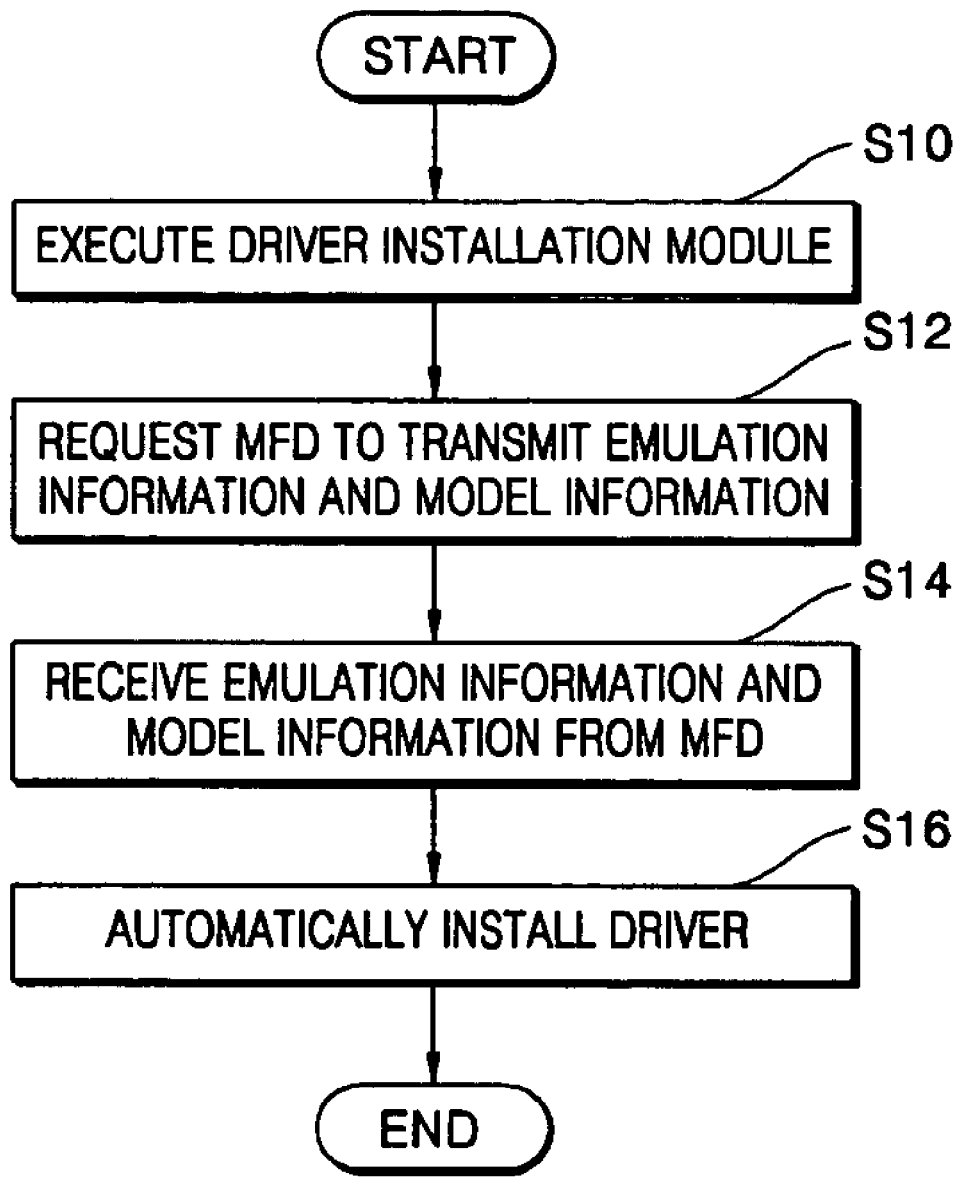
FIG. 4 is a flowchart of an automatic driver installation method according to an embodiment of the present invention.
Figure 5:
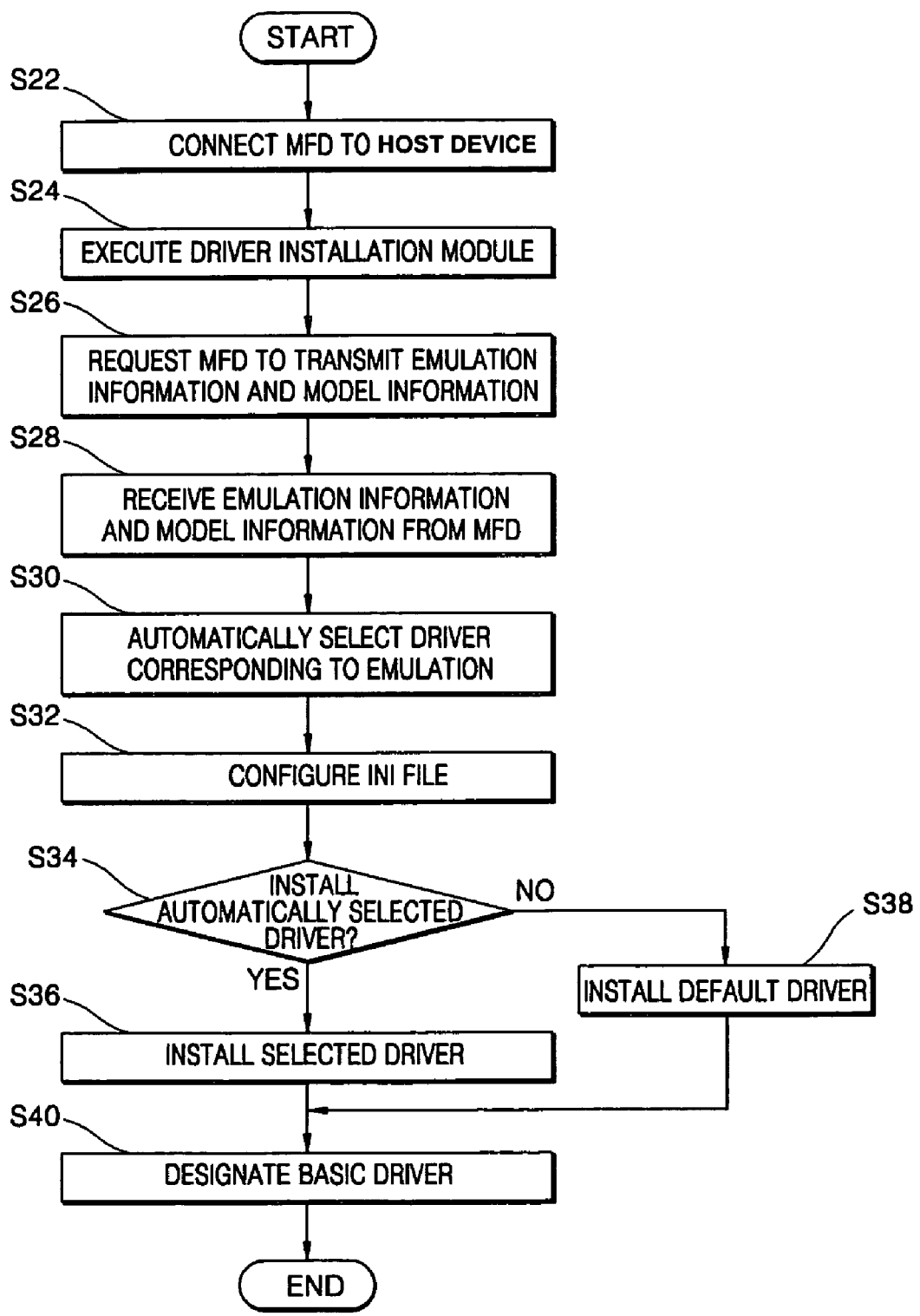
FIG. 5 is a detailed flowchart of an automatic driver installation method according to an embodiment of the present invention.

Hereinafter, a method of automatically installing drivers in a host device for driving an MFD connected to the host device and having at least one emulation, will be described with reference to FIGS. 4 and 5. FIG. 4 is a flowchart of an automatic driver installation method according to an embodiment of the present invention, and FIG. 5 is a detailed flowchart of an automatic driver installation method according to an embodiment of the present invention.

Referring to FIG. 4, in step S10, a user executes a driver installation module included in the host device. Then, in step S12, the driver installation module requests the MFD to transmit model information of the MFD and emulation information indicating which emulations are included with the MFD. Then, in step S14, the driver installation module receives the emulation information and the model information from the MFD. Finally, in step S16, the driver installation module automatically selects and installs drivers in the host device based on the received emulation information and the received model information.

Hereinafter, an automatic installation method according to the present invention will be described in greater detail with reference to FIG. 5. In step S22, an MFD is connected to a host device. Then, in step S24, a user executes a driver installation module included in the host device. In step S26, the driver installation module requests the MFD to transmit model information of the MFD and emulation information indicating which emulations are included with the MFD. In step S28, the driver installation module receives the emulation information and the model information from the MFD. Here, the emulation information and the model information provided by the MFD can be stored in a read only memory (ROM) of the MFD.

The driver installation module can include all drivers that can be provided by the manufacturer of the MFD, corresponding to all emulations which can be included in the MFD. However, a warning message can be provided and output when the driver installation module does not include drivers corresponding to emulations included in the MFD. Here, the warning message or a notification message can be displayed on a monitor of the host device, or can be printed by using the MFD.

Therefore, in step S30, the driver installation module can automatically select a driver, corresponding to each emulation, from among the drivers included in the driver installation module based on the received emulation information. In step S32, the driver installation module can then configure an initialization (INI) file, which is a file defining the model, based on the received model information. Then, in step S34, a user can be requested to confirm whether the user wishes to install the automatically selected driver or not. When the user confirms that the user wishes to install the automatically selected driver, the selected driver is installed in step S36. In contrast, when the user does not confirm that the user wishes to install the automatically selected driver, a default driver is installed in step S38. Here, the default driver can include all drivers provided by the driver installation module. Therefore, all drivers can be installed. Finally, in step S40, when a plurality of drivers are installed, a dialog box is displayed so that the user can designate a basic driver.

Although the present invention is described in relation to MFD devices, the present invention can also be applied to printers or scanners. Here, the MFD is a device that includes multiple functions, such as those of a printer, a scanner, and a copier.

As described above, the present invention makes it unnecessary for manufactures to make a separate driver installation module for each model by providing a unified driver installation module having all drivers corresponding to all emulations.

Also, since drivers are automatically installed based upon received emulation information and model information stored in an MFD, the user can install drivers conveniently.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of automatically installing drivers in a host device for driving an apparatus that is connected to the host device and having at least one emulation, the method comprising the steps of:
   executing a driver installation module included in the host device, wherein the driver installation module comprises a plurality of drivers corresponding to emulations included in the apparatus;
   requesting the apparatus to transmit model information of the apparatus and emulation information indicating which emulations are included with the apparatus;
   receiving the emulation information and the model information from the apparatus, wherein the emulation information and the model information provided by the apparatus are stored in a memory of the apparatus;
   requesting a user to confirm whether the user wishes to install drivers corresponding to the received emulation information and the received model information or a default driver; and
   installing the drivers in the host device corresponding to the received emulation information and the received model information or the default driver in response to the user confirmation, wherein the step of installing drivers in the host device comprises the step of configuring an initialization (INI) file, wherein the initialization file defines the model based on the received model information.

2. The method of claim 1, further comprising the step of outputting a warning message when the driver installation module does not include drivers corresponding to the emulations included in the apparatus.

3. The method of claim 1, wherein the step of installing drivers in the host device comprises the step of automatically selecting a driver corresponding to each emulation included in the apparatus based on the received emulation information.

4. The method of claim 1, wherein the memory of the apparatus comprises a read only memory (ROM).

5. The method of claim 1, wherein the apparatus comprises a printer or a multi-functional device (MFD).

6. A system, comprising an apparatus having at least one emulation and a host device connected to the apparatus, for automatically installing drivers in the host device for driving the apparatus, the system comprising:
   an executing unit for executing a driver installation module included in the host device, wherein the driver installation module comprises a plurality of drivers corresponding to emulations included in the apparatus;
   a requesting unit included in the driver installation module for requesting the apparatus to transmit model information of the apparatus and emulation information indicating which emulations are included with the apparatus;
   a receiving unit included in the driver installation module for receiving the emulation information and the model information from the apparatus; and
   an installing unit included in the driver installation module for requesting a user to confirm whether the user wishes to install drivers corresponding to the received emulation information and the received model information or a default driver and in response, installing the drivers corresponding to the received emulation information and the received model information or the default driver, wherein the installing unit comprises means for automatically selecting a driver corresponding to each emulation based on the received emulation information, and comprises means for configuring an initialization (INI) file, wherein the initialization file defines the model based on the received model information.

7. The system of claim 6, further comprising means for outputting a warning message when the driver installation module does not include drivers corresponding to the emulations included in the apparatus.

8. The system of claim 6, wherein the apparatus comprises a memory for storing the emulation information and the model information.

9. The system of claim 8, wherein the memory comprises a read only memory (ROM).

10. The system of claim 6, wherein the apparatus comprises a printer or a multi-functional device (MFD).

* * * * *